(12) United States Patent
Gao et al.

(10) Patent No.: US 11,923,622 B2
(45) Date of Patent: Mar. 5, 2024

(54) ANTENNA AND WIRELESS COMMUNICATION DEVICE

(71) Applicant: Nokia Solutions and Networks Oy, Espoo (FI)

(72) Inventors: Fei Gao, Shanghai (CN); Chaojun Xu, Shanghai (CN); Gang Shen, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 542 days.

(21) Appl. No.: 17/264,349

(22) PCT Filed: Aug. 2, 2018

(86) PCT No.: PCT/CN2018/098382
§ 371 (c)(1),
(2) Date: Jan. 29, 2021

(87) PCT Pub. No.: WO2020/024232
PCT Pub. Date: Feb. 6, 2020

(65) Prior Publication Data
US 2021/0296775 A1 Sep. 23, 2021

(51) Int. Cl.
*H01Q 1/38* (2006.01)
*H01Q 5/385* (2015.01)
*H01Q 7/00* (2006.01)

(52) U.S. Cl.
CPC .............. *H01Q 7/00* (2013.01); *H01Q 1/38* (2013.01); *H01Q 5/385* (2015.01)

(58) Field of Classification Search
CPC ............ H01Q 7/00; H01Q 5/385; H01Q 1/38
USPC ......................................................... 343/865
See application file for complete search history.

(56) References Cited

U.S. PATENT DOCUMENTS

| | | | |
|---|---|---|---|
| 9,263,789 B2 * | 2/2016 | Breiter | H01Q 1/243 |
| 2007/0080885 A1 | 4/2007 | Ozkar et al. | 343/806 |
| 2007/0182658 A1 | 8/2007 | Ozden | 343/866 |
| 2012/0001815 A1 * | 1/2012 | Wong | H01Q 9/0421 |
| | | | 343/843 |
| 2012/0169553 A1 | 7/2012 | Nomura et al. | 343/741 |

FOREIGN PATENT DOCUMENTS

| | | |
|---|---|---|
| EP | 1 739 788 A1 | 1/2007 |
| KR | 2014-0119534 | 10/2014 |
| WO | WO-2012/069884 A1 | 5/2012 |
| WO | WO 2013/115147 A1 | 8/2013 |
| WO | WO 2017/083142 A1 | 5/2017 |

* cited by examiner

*Primary Examiner* — Peguy Jean Pierre
(74) *Attorney, Agent, or Firm* — Harrington & Smith (57) ABSTRACT

In accordance with some embodiments, there is provided an apparatus. The apparatus includes a conductive loop; a first conductive member electromagnetically coupled to the conductive loop and galvanically coupled to a radio frequency circuit; a second conductive member arranged across and electromagnetically coupled to the conductive loop; and a third conductive member arranged across and electromagnetically coupled to the conductive loop, the third conductive member being spaced apart from the second conductive member and electromagnetically coupled to the first conductive member.

15 Claims, 6 Drawing Sheets

ANTENNA AND WIRELESS COMMUNICATION DEVICE

CROSS REFERENCE TO RELATED APPLICATION

This patent application is a U.S. National Stage application of International Patent Application Number PCT/CN2018/098382 filed Aug. 2, 2018, which is hereby incorporated by reference in its entirety.

TECHNICAL FIELD

Embodiments of the present disclosure generally relate to the field of wireless communication, and in particular, to an antenna and associated wireless communication device.

BACKGROUND

An antenna is the interface between radio waves propagating through space and electric currents moving in metal conductors, used with a transmitter or receiver. Currently, an increasing number of antennas are deployed in wireless communication, for example, Wi-Fi application. The increased antennas are deployed to improve the communication performance and produce more function based on wireless communication such as Wi-Fi application. However, the increased antennas in most of the products are visible to the customers, which is aesthetically unappealing. Therefore, there is a need to miniaturize the antenna to obtain a space saving antenna solution.

SUMMARY

In general, example embodiments of the present disclosure provide an antenna and associated wireless communication device.

In accordance with some embodiments, there is provided an apparatus. The apparatus comprises a conductive loop; a first conductive member electromagnetically coupled to the conductive loop and galvanically coupled to a radio frequency circuit; a second conductive member arranged across and electromagnetically coupled to the conductive loop; and a third conductive member arranged across and electromagnetically coupled to the conductive loop, the third conductive member being spaced apart from the second conductive member and electromagnetically coupled to the first conductive member.

In accordance with some embodiments, there is provided an antenna module. The antenna module comprises the apparatus as described above.

In accordance with some embodiments, there is provided a wireless communication device. The wireless communication device comprises the apparatus as described above.

In accordance with some embodiments, there is provided a method. The method comprises providing a substrate; forming a conductive loop on a first surface of the substrate; forming a first conductive member on a second surface of the substrate, the second surface being opposite to the first surface, and the first conductive member being electromagnetically coupled to the conductive loop and galvanically coupled to a radio frequency circuit; forming a second conductive member on the second surface of the substrate, the second conductive member being arranged across and electromagnetically coupled to the conductive loop; and forming a third conductive member on the second surface of the substrate, the third conductive member being arranged across and electromagnetically coupled to the conductive loop, spaced apart from the second conductive member and electromagnetically coupled to the first conductive member.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, some values are provided herein only for illustrative purpose without suggesting any limitation as to the scope of the present disclosure.

Figure 1:
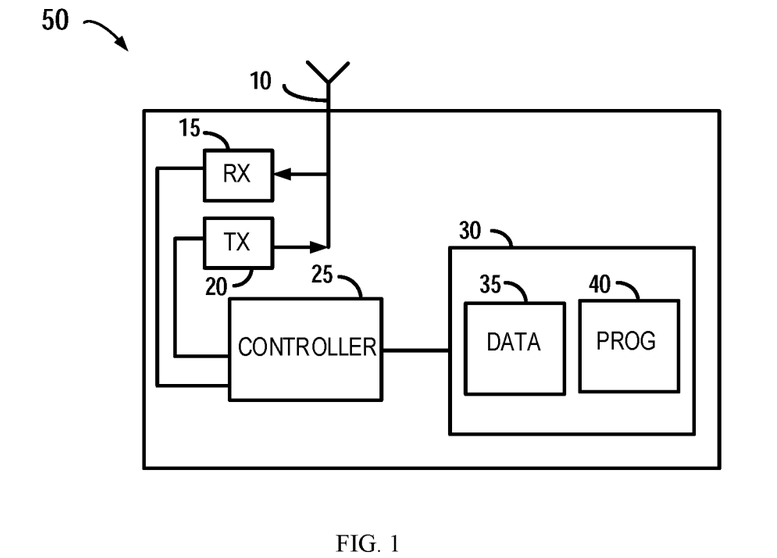
FIG. 1 shows a schematic diagram of a wireless communication device in accordance with embodiments of the present disclosure.

Reference is now made to FIG. 1 for illustrating a simplified block diagram of an apparatus 50 suitable for use in practicing the example embodiments of the present disclosure. In FIG. 1, the apparatus 50 is configured to communicate with another apparatus having wireless communication capability. For example, the apparatus 50 can be implemented as a wireless access point, such as a wireless router. The wireless access point being one example of a fixed electronic communication device, other examples may be any other suitable fixed or mobile electronic device capable of providing wireless communications capabilities, for example and not limited to, a smartphone, a base station, a consumer electronics device, a computer, a tablet, a laptop computer, a device installed in an automobile, or the like. Although the present disclosure will be described mainly with reference to the Wi-Fi application, it is to be understood that the present disclosure may also be applied to any other suitable wireless communication application.

The apparatus 50 includes a processing device such as at least one controller 25, at least one storage device such as at least one computer-readable memory (MEM) 30 storing data 35 and at least one computer program (PROG) 40 or other set of executable instructions, at least one communication device such as a transmitter TX 20 and a receiver RX 15 for bidirectional wireless communications with other wireless devices via one or more antennas 10.

As described above, a large number of exposed antennas are aesthetically unappealing and there is a need to miniaturize the antenna to save space. In some examples, the antenna may be embedded in the wireless product for aesthetical purpose, for example. In other examples, the antenna may be made smaller for external use to obtain a space saving wireless product. In addition, in some applications, for example, indoor localization based on angle of arrival (AoA), an omni-directional antenna can provide a better Angle of arrival (AoA) determination. Therefore, a low profile, small size omni-directional antenna is also very desirable.

Figure 2A:
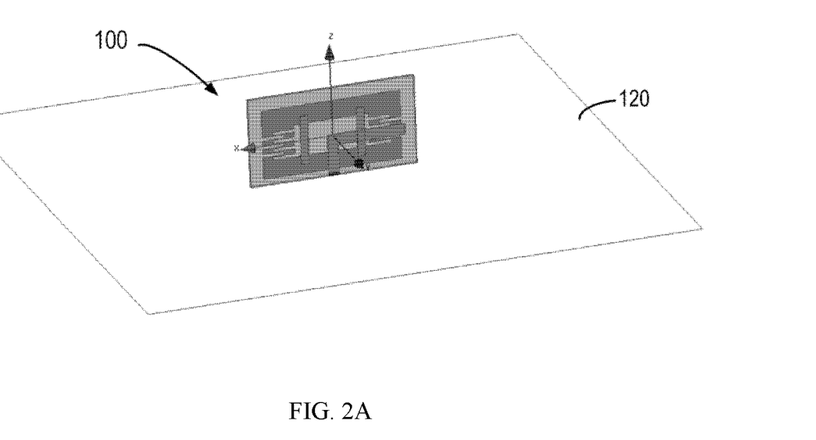
FIGS. 2A-2B show diagrams of an antenna in accordance with embodiments of the present disclosure.
Figure 2B:
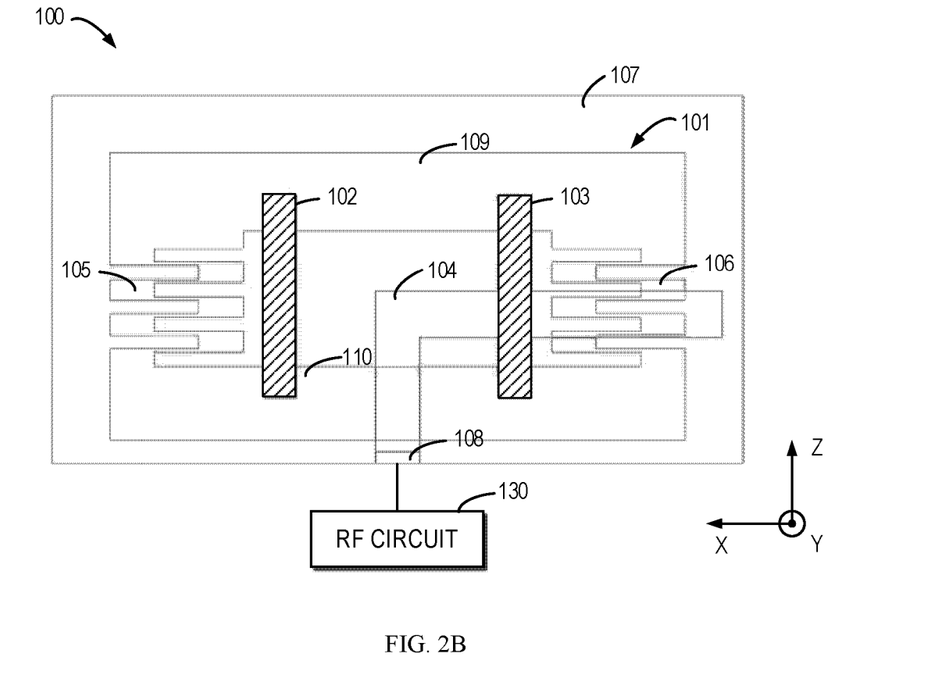

FIGS. 2A-2B show schematic diagrams of an apparatus 100 in accordance with embodiments of the present disclosure. The apparatus 100 may be implemented as the antenna 10 as shown in FIG. 1. The apparatus 100 may have a relatively small form factor and can be arranged inside the housing of the apparatus 50. As shown in FIGS. 2A-2B, the apparatus 100 may be electromagnetically coupled to the ground plane 120. For example, the apparatus 100 may be mounted on a ground plane 120 and fed by a coaxial line. The ground plane 120 may be made of metal material. As shown in FIG. 2A, the ground plane 120 may be arranged transverse or perpendicular to the apparatus 100. In particular, the ground plane 120 is arranged in the x-y plane, and the apparatus 100 is arranged in the x-z plane. In this way, the coupling between the ground plane 120 and apparatus 100 can produce an image that makes antenna half in size compared to the antenna without the ground plane 120. It is to be understood, however, in alternative embodiments, the ground plane 120 may be disposed in the same plane as the antenna substrate 107, or at least in the same orientation.

In some embodiments, the apparatus 100 is a microstrip antenna or a planar antenna, for example, a dual-band omni-directional antenna. The apparatus 100 includes a conductive loop 101 made of conductive material such as metal. The conductive loop 101 may also be referred to as a radiator. The conductive loop 101 is configured to operate at a lower frequency band in a dual band application, for example, 2.4 GHz band in a dual band Wi-Fi application. For example, in transmission the conductive loop 101 radiates energy from an electric current as electromagnetic waves (for example, radio waves), and in reception the conductive loop 101 intercepts some of the power of an electromagnetic wave to produce an electric current. The electromagnetic waves may have a frequency in 2.4 GHz band for the dual band Wi-Fi application.

For example, at a certain frequency such as 2.4 GHz, the conductive loop 101 (in particular, the meander line) can capture the electric field in the near-field region to produce a large induced current. The large induced current can create an inductance that can be used to form a natural resistance-inductance-capacitance (RLC) matching element. In particular, the inductance produced by the meander line is sufficiently large to match the large capacitance of the electrically small monopole antenna. For example, the antenna may have a height of $0.1\lambda$, where the parameter $\lambda$ is the wavelength of the lower frequency band, which is about 12.5 mm at 2.4 GHz. The number of meander lines may be adjusted to provide necessary inductance to form the RLC matching element.

In some embodiments, the conductive loop 101 includes a first conductive meander portion 105, shown as the left arm of the conductive loop 101. Ends of the first conductive meander portion 105 are electromagnetically coupled to ends of the second conductive member 102. The conductive loop 101 further includes a second conductive meander portion 106, shown as the right arm of the conductive loop 101. Ends of the second conductive meander portion 106 are electromagnetically coupled to ends of the third conductive member 103. The meander portions enable reduction in the size of the conductive loop 101 and thus the apparatus 100. It is to be noted that, however, all of the first conductive meander portion 105 (and the second conductive meander portion 106) can be electromagnetically coupled to the whole of the second conductive member 102 (and the third conductive member 103).

In some embodiments, the conductive loop 101 has a rectangular shape, and the conductive loop 101 includes a first conductive portion 109 shown as the upper arm and a second conductive portion 110 shown as the lower arm. In other embodiments, the conductive loop 101 may have any other suitable shape, for example and not limited to, s square, circular, oval, or any other geometric shape which can create a "loop". Each of the first and second conductive portions 109 and 110 are configured to connect to the first and second conductive meander portions 105 and 106. For example, the first and second conductive meander portions 105 and 106, and the first and second conductive portion 109 and 110 of the conductive loop 101 may form a continuous uninterrupted loop of conductive material; in other words there are no gaps or interruptions to the conductive traces such that a direct current (DC) can flow around the complete loop. In this way, the conductive loop 101 may be also referred to as a closed loop of conductive material.

Conductive members 102 and 103 are arranged across the conductive loop 101 and electromagnetically coupled to the conductive loop 101. As used herein, if a first element is arranged across a second element, the first element is coupled to two sides or two ends of the second element. As shown in FIG. 2B, each of the conductive members 102 and 103 is configured to extend from one side of the conductive loop 101 to another side of the conductive loop 101, or each of the conductive members 102 and 103 is configured to extend from one location on the conductive loop 101 to another location of the conductive loop 101. The conductive members 102 and 103 are shown in FIG. 2B as two vertical strips in the z direction, also referred to as vertical coupling strips. As shown in FIG. 2B, the conductive members 102 and 103 are symmetrically arranged in the x direction. For example, the conductive members 102 and 103 may be capacitively coupled to the conductive loop 101, and in particular to the conductive meander portions 105 and 106.

The conductive member 103 is spaced apart from the conductive member 102 and electromagnetically coupled to the conductive members 104. The conductive members 102 and 103 are coupled to the conductive loop 101 to form a loop antenna (also referred to as a coupled loop) that operates at a higher frequency band in the dual band application, for example, a 5.1-5.8 GHz band for the dual band Wi-Fi application.

The two vertical coupling strips have little effect on the radiation at the lower frequency band of 2.4 GHz. The two strips may have a length that is large enough to have a capacitive coupling with the radiator. The location of the strips along the x axis determines the arrangement and thus determines the operating frequency of the loop antenna.

As shown in FIG. 2B, the conductive members 102 and 103 are arranged without extending beyond the outline of the conductive loop 101. As such, the dimension of the apparatus 100 will be delimited by the conductive loop 101, which helps minimize the footprint of the antenna 100.

A conductive member 104 is electromagnetically coupled to the conductive loop 102 and galvanically coupled to a radio frequency (RF) circuit 130 via a feed point 108. The radio frequency circuit 130 is at least one of a receiver circuit 15 and a transmitter circuit 20 as shown in FIG. 1. As used herein, if a first element is galvanically coupled to a second element, there can be a current path between the first and second elements. In other words, current can flow from the first element to the second element, and/or from the second element to the first element. It is to be noted that the feed point 108 and the antenna can convey RF signals in only one direction (receiving or transmitting a RF signal) or both directions (receiving and/or transmitting a RF signal).

For example, the conductive member 104 can receive and/or transmit an electric current from and/or to the RF circuit 130. For example, the conductive member 104 may be L-shaped and include a first portion electromagnetically coupled to the conductive loop 101 and to the conductive member 103. The first portion may intersect with the conductive member 103. The conductive member 104 may further include a second portion galvanically coupled to the radio frequency circuit. The first portion is substantially perpendicular to the second portion.

In some embodiments, the conductive loop 101 is arranged on a different plane than the first, second and third conductive members 104, 102 and 103. In this way, the conductive members 102 and 103 will not have any substantial impact on the conductive loop 102 for lower frequency application. In some embodiments, the first, second and third conductive members 104, 102 and 103 are arranged on a same plane. In some embodiments, the conductive loop 101 is arranged on a first surface of a substrate 107, and the first, second and third conductive members 104, 102 and 103 are disposed on a second surface of the substrate 107 opposite to the first surface. In alternative embodiments, the third conductive member 104 may be disposed on a different plane than the first and second conductive members 102 and 103.

The electric field is coupled by the conductive member 104 (an L-shaped feeding structure) to the conductive loop 101 (a rectangular antenna radiator) through the substrate 107. Although in the example embodiment the substrate 107 is shown as having an area larger than the conductive loop 101, the substrate could have the same area as the conductive loop 101 in other embodiments. As an example, the substrate may be 0.5 mm thick and the substrate may be a laminate structure with the permittivity of 2.55 and tangent loss of 0.006. The length of the L-shaped feeding structure can tailor the resistance of the radiator in order to match the 50 Ohm source and to achieve a small profile antenna system.

Figure 3A:
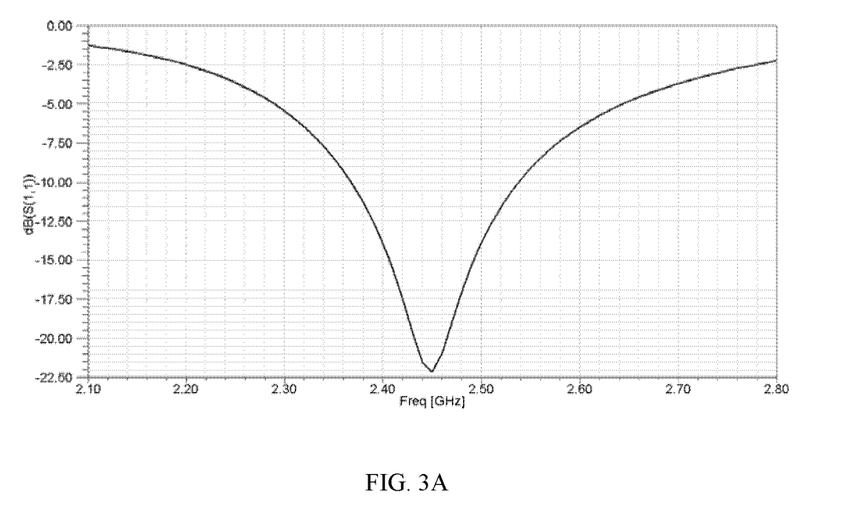
FIGS. 3A-3B show diagrams of simulated reflection coefficients of an example antenna in accordance with embodiments of the present disclosure.
Figure 3B:
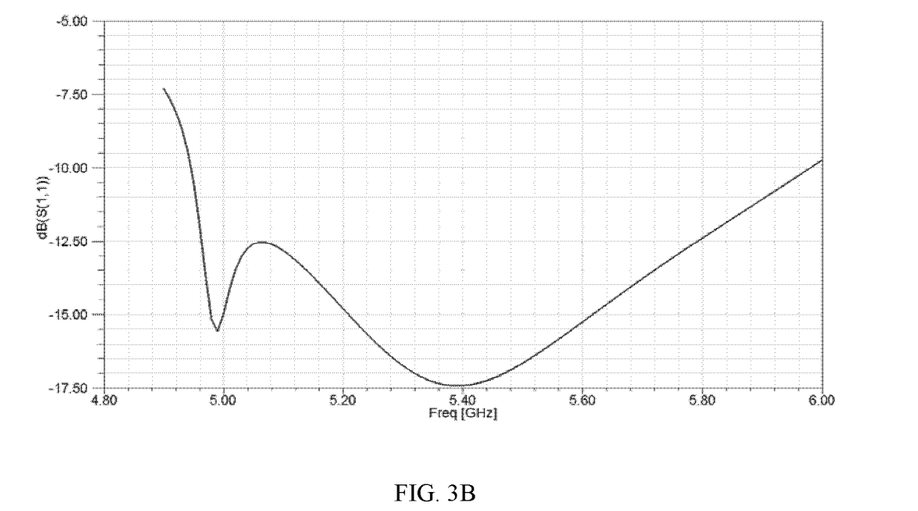

FIGS. 3A-3B show simulated reflection coefficients of the apparatus 100. The dimension of the apparatus 100 for simulation is summarized below. It is to be understood, however, the values are provided only for illustrative purpose without suggesting any limitation as to the scope of the present disclosure.

The example antenna has a height of 12.5 mm in the z direction and a width of 25 mm in the x direction (not including the substrate dimensions which are larger in this example embodiment). The left and right arms have a width of 5.8 mm in the x direction, and the top and bottom arms have a width of 3.3 mm in the z direction. The conductive members 102 and 103 have a width of 1.4 mm in the x direction and a length of 8.8 mm in the z direction. The conductive member 104 has a dimension of 14 mm in the x direction and a dimension of 6.5 mm in the z direction.

As shown in FIGS. 3A-3B, the −10 dB Return Loss (S11) level indicates operating frequency band ranges from 2.37 GHz to 2.57 GHz and 4.97 GHz to 5.97 GHz, respectively, and covers the 2.4 GHz, 5.2 GHz and 5.8 GHz operating frequency bands of Wireless Local Area Network (WLAN).

Figure 4:
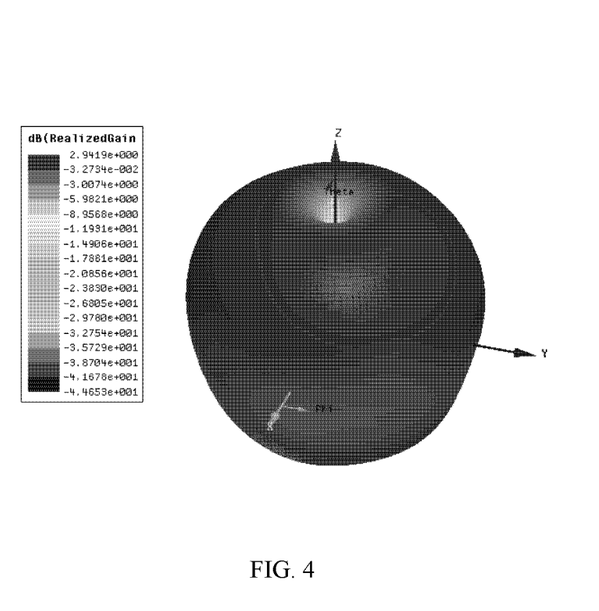
FIG. 4 shows a simulated 3D radiation pattern of the example antenna at 2.4 GHz.
Figure 5:
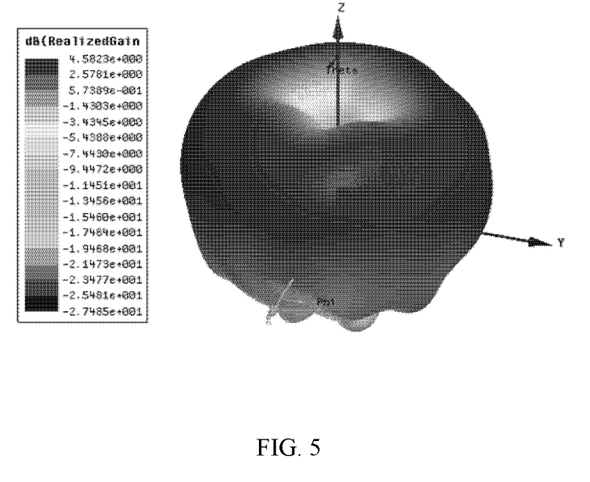
FIG. 5 shows a simulated 3D radiation pattern of the example antenna at 5.3 GHz.
Figure 6:
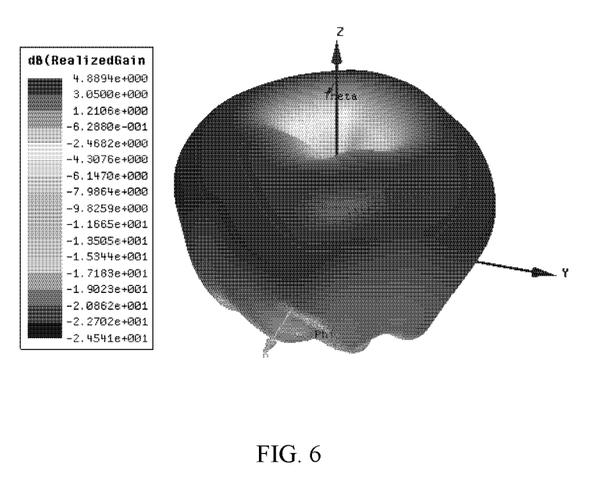
FIG. 6 shows a simulated 3D radiation pattern of the example antenna at 5.5 GHz.
Figure 7:
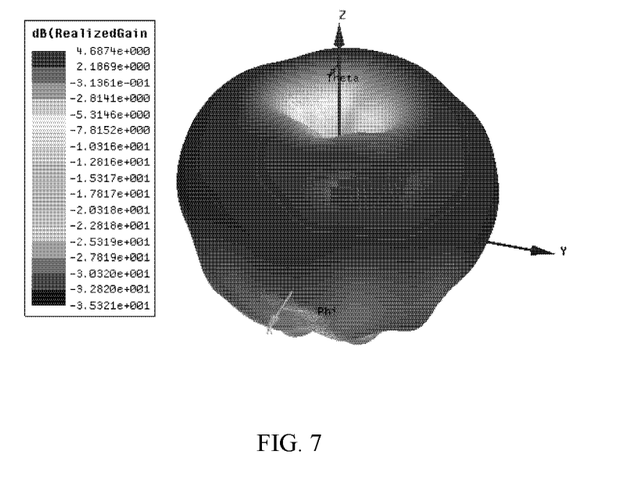
FIG. 7 shows a simulated 3D radiation pattern of the example antenna at 5.7 GHz.

FIG. 4 shows a simulated 3D radiation pattern of the apparatus 100 at 2.4 GHz, FIG. 5 shows a simulated 3D radiation pattern of the apparatus 100 at 5.3 GHz, FIG. 6 shows a simulated 3D radiation pattern of the apparatus 100 at 5.5 GHz, and FIG. 7 shows a simulated 3D radiation pattern of the apparatus 100 at 5.7 GHz. Omni-directional radiation is achieved across all of the operating frequency bands. As shown, the gain is 3 dBi at 2.4 GHz, and the gain in the 5 GHz band can reach more than 4 dBi. Accordingly, the antenna can achieve the miniaturization while maintaining a high gain.

Figure 8:
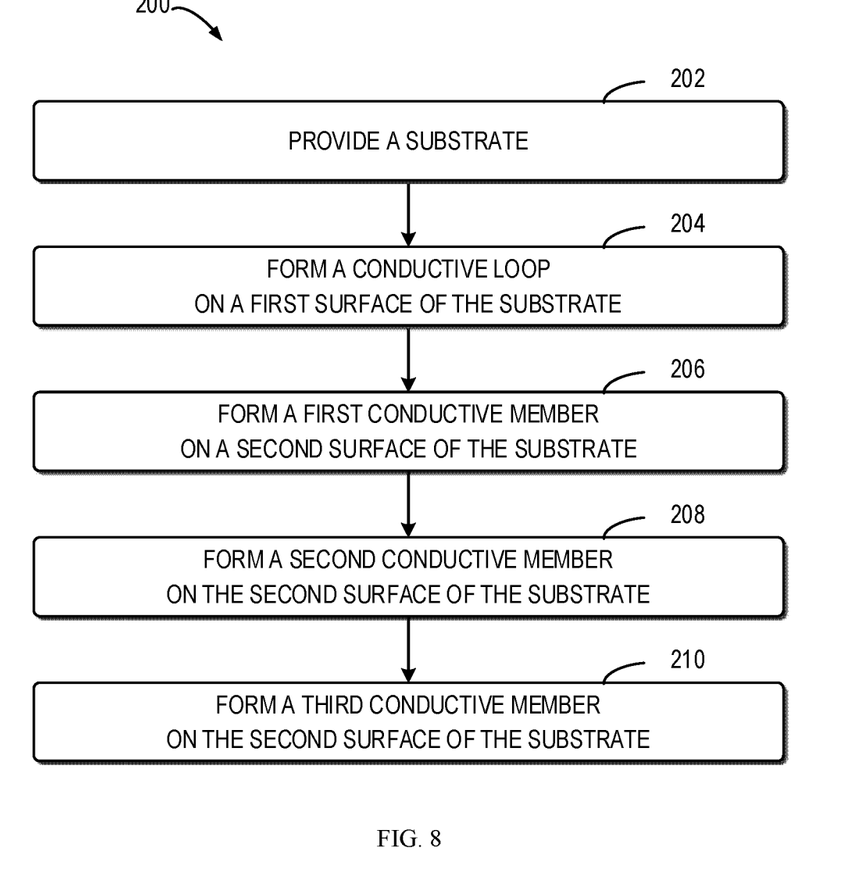
FIG. 8 shows a flow chart of producing an antenna in accordance with embodiments of the present disclosure.

FIG. 8 illustrates a flowchart of an example method 200 of producing an antenna in accordance with some embodiments of the present disclosure. The antenna may be the apparatus 100 as shown in FIGS. 2A-2B. It is to be understood that the method 200 may also include additional acts not shown and/or may omit some acts as shown.

As shown in FIG. 8, at block 202, a substrate 107 is provided. At block 204, a conductive loop 101 is formed on a first surface of the substrate 107. At block 206, a first conductive member 104 is formed on a second surface of the substrate 107, the second surface being opposite to the first surface. The first conductive member 104 is electromagnetically coupled to the conductive loop 101 and galvanically coupled to a RF circuit 130.

At block 208, a second conductive member 102 is formed on the second surface of the substrate 107. The second conductive member 102 is arranged across and electromagnetically coupled to the conductive loop 101.

At block 210, a third conductive member 103 is formed on the second surface of the substrate 107. Third conductive member 103 is arranged across and electromagnetically coupled to the conductive loop 101, spaced apart from the second conductive member 102 and electromagnetically coupled to the first conductive member 104.

It should be understood that all the features about the apparatus 100 and the antenna, as described above with reference to FIGS. 1 and 2, are also applicable to the corresponding producing method and thus omitted here.

Although the present disclosure has been described in language specific to structural features, it is to be understood that the present disclosure defined in the appended claims is not necessarily limited to the specific features described above. Rather, the specific features and acts described above are disclosed as example forms of implementing the claims.

What is claimed is:
1. An apparatus, comprising:
   a conductive loop;

a first conductive member electromagnetically coupled to the conductive loop and galvanically coupled to a radio frequency circuit;

a second conductive member arranged across and electromagnetically coupled to the conductive loop; and a third conductive member arranged across and electromagnetically coupled to the conductive loop, the third conductive member being spaced apart from the second conductive member and electromagnetically coupled to the first conductive member;

wherein the conductive loop comprises:
- a first conductive meander portion, ends of the first conductive meander portion electromagnetically coupled to respective ends of the second conductive member; and
- a second conductive meander portion, ends of the second conductive meander portion electromagnetically coupled to respective ends of the third conductive member.

2. The apparatus of claim 1, wherein the conductive loop is of a rectangular shape, and wherein the conductive loop further comprises first and second conductive portions each connecting the first and second conductive meander portions.

3. The apparatus of claim 1, wherein the first conductive member is L-shaped and comprises:
- a first portion electromagnetically coupled to the conductive loop and to the third conductive member; and
- a second portion galvanically coupled to the radio frequency circuit, the first portion being substantially perpendicular to the second portion.

4. The apparatus of claim 1, wherein the conductive loop is arranged on a different plane than the first, second and third conductive members.

5. The apparatus of claim 4, wherein the first, second and third conductive members are arranged on a same plane.

6. The apparatus of claim 5, wherein the conductive loop is arranged on a first surface of a substrate, and wherein the first, second and third conductive members are disposed on a second surface of the substrate, the first and second surfaces being opposite to one another.

7. The apparatus of claim 1, wherein the apparatus is a dual-band omni-directional antenna.

8. The apparatus of claim 1, wherein the RF circuit comprises at least one of a transmitter circuit and a receiver circuit.

9. An antenna module, comprising the apparatus of claim 1.

10. The antenna module of claim 9, further comprising: a ground plane electromagnetically coupled to the apparatus, the ground plane being arranged transverse to the apparatus.

11. A wireless communication device, comprising the apparatus of claim 1.

12. The wireless communication device of claim 11, wherein the wireless communication device is at least one of a wireless access point, a smartphone, a base station, a consumer electronics device, a computer, a tablet, a laptop computer, or a device installed in an automobile.

13. A method, comprising:
providing a substrate;
forming a conductive loop on a first surface of the substrate;
forming a first conductive member on a second surface of the substrate, the second surface being opposite to the first surface, and the first conductive member being electromagnetically coupled to the conductive loop and galvanically coupled to a radio frequency circuit;
forming a second conductive member on the second surface of the substrate, the second conductive member being arranged across and electromagnetically coupled to the conductive loop; and
forming a third conductive member on the second surface of the substrate, the third conductive member being arranged across and electromagnetically coupled to the conductive loop, spaced apart from the second conductive member and electromagnetically coupled to the first conductive member.

14. The method of claim 13, wherein forming the conductive loop comprises: forming a first conductive meander portion, ends of the first conductive meander portion electromagnetically coupled to respective ends of the second conductive member; and forming a second conductive meander portion, ends of the second conductive meander portion electromagnetically coupled to respective ends of the third conductive member.

15. An apparatus comprising:
a conductive loop;
a first conductive member electromagnetically coupled to the conductive loop and galvanically coupled to a radio frequency circuit;
a second conductive member arranged across and electromagnetically coupled to the conductive loop; and
a third conductive member arranged across and electromagnetically coupled to the conductive loop, the third conductive member being spaced apart from the second conductive member and electromagnetically coupled to the first conductive member;
wherein the first conductive member is L-shaped and comprises:
- a first portion electromagnetically coupled to the conductive loop and to the third conductive member; and
- a second portion galvanically coupled to the radio frequency circuit, the first portion being substantially perpendicular to the second portion.

* * * * *